US006661543B1

(12) United States Patent  (10) Patent No.: US 6,661,543 B1
Morita  (45) Date of Patent: Dec. 9, 2003

(54) IMAGE SCANNER

(75) Inventor: Yuukichi Morita, Kanazawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 09/546,395

(22) Filed: Apr. 10, 2000

(30) Foreign Application Priority Data

Apr. 9, 1999 (JP) .......................................... 11-101964

(51) Int. Cl.⁷ ................................................. H04N 1/04
(52) U.S. Cl. ....................... 358/498; 358/498; 358/474; 358/487; 358/497; 358/408; 358/496
(58) Field of Search ................................ 358/497, 498, 358/408, 496, 474, 487; 355/75

(56) References Cited

U.S. PATENT DOCUMENTS

| 4,908,719 A | * | 3/1990 | Nonoyama .................. 358/494 |
| 5,363,184 A | * | 11/1994 | Matsuo et al. .............. 399/367 |
| 5,564,686 A | * | 10/1996 | Horng ....................... 271/4.01 |
| 5,785,441 A | | 7/1998 | Kobayashi et al. |
| 5,881,351 A | | 3/1999 | Shimotoso et al. |

FOREIGN PATENT DOCUMENTS

| DE | 298 14 558 | 8/1998 |
| EP | 0689341 A2 | 12/1995 |
| EP | 0832748 A2 | 4/1998 |

* cited by examiner

Primary Examiner—Edward Coles
Assistant Examiner—Heather D Gibbs

(57) ABSTRACT

An automatic-paper-feed-type document scanning mechanism is disposed on flat-bed-type document scanning mechanism and discharges documents onto the document holding cover of the flat-bed-type document scanning mechanism. The document holding cover includes a groove formed in the document holding cover and a stopper member fitted therein. The groove extends in the document transport direction and has a first engagement portion on its side wall. The stopper member has a base portion which has a second engagement portion that can be engaged with the first engagement portion and can be moved along the document transport direction while being guided by the groove, and a vertical portion projecting perpendicular from the base portion.

12 Claims, 18 Drawing Sheets

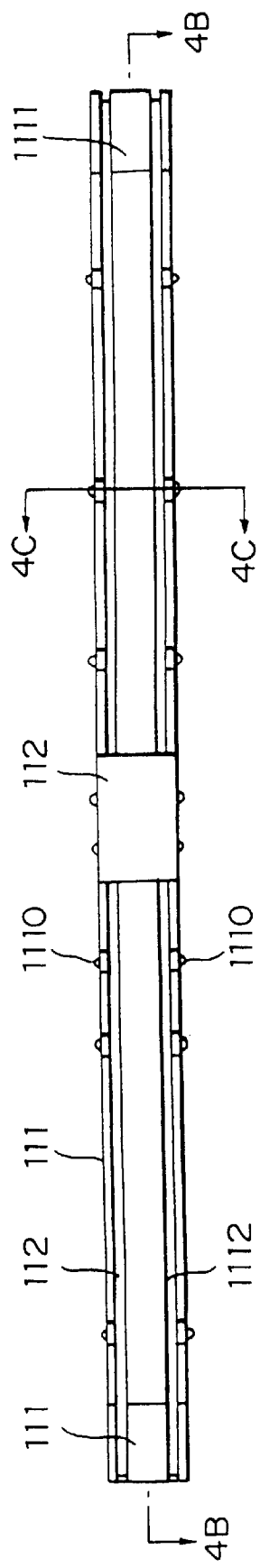
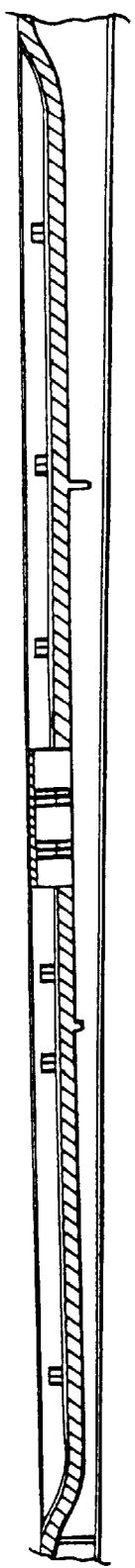
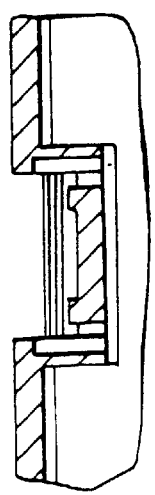
FIG. 4A
FIG. 4B
FIG. 4C

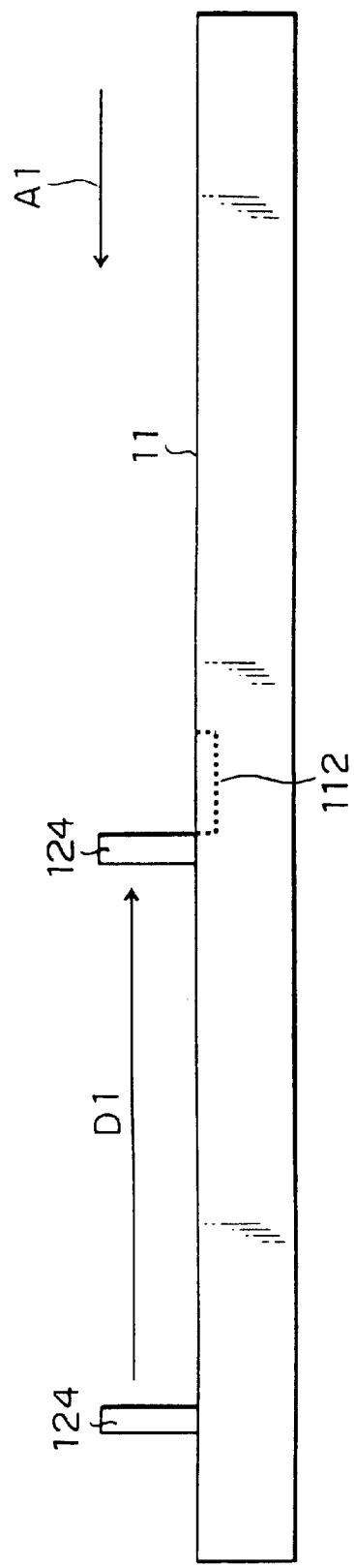
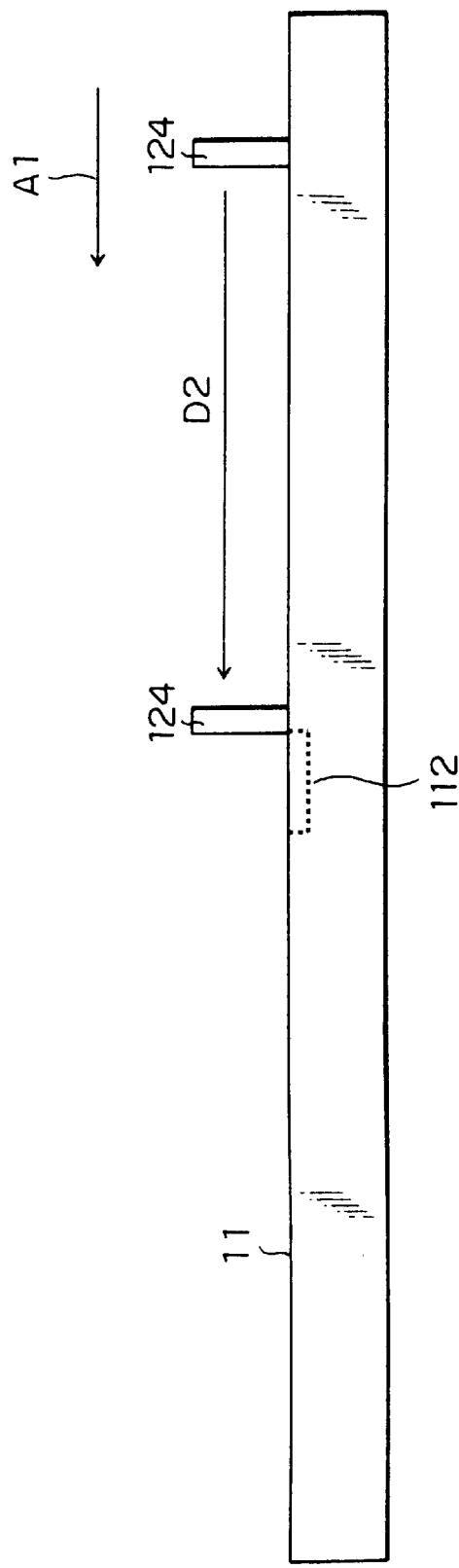

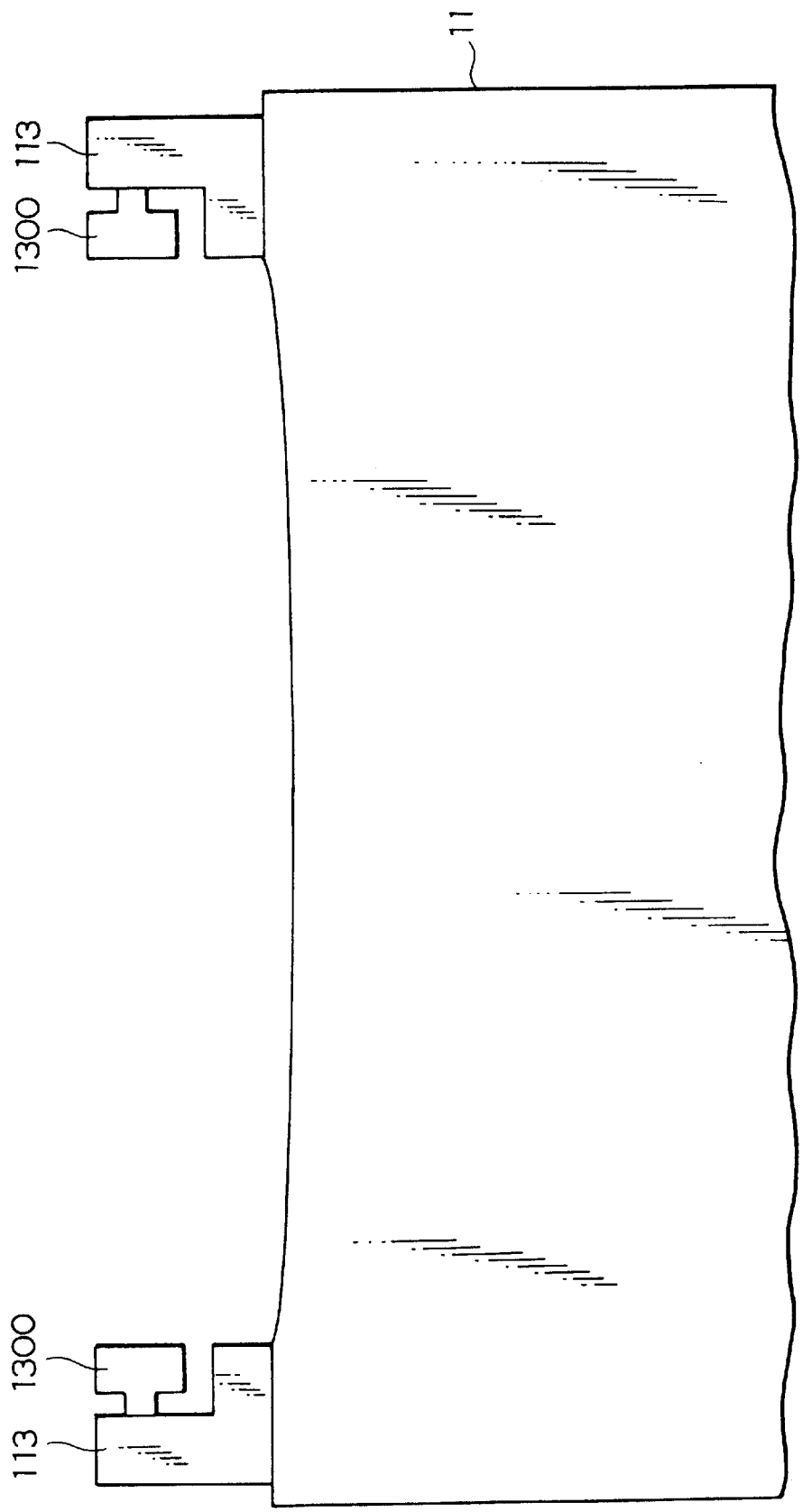

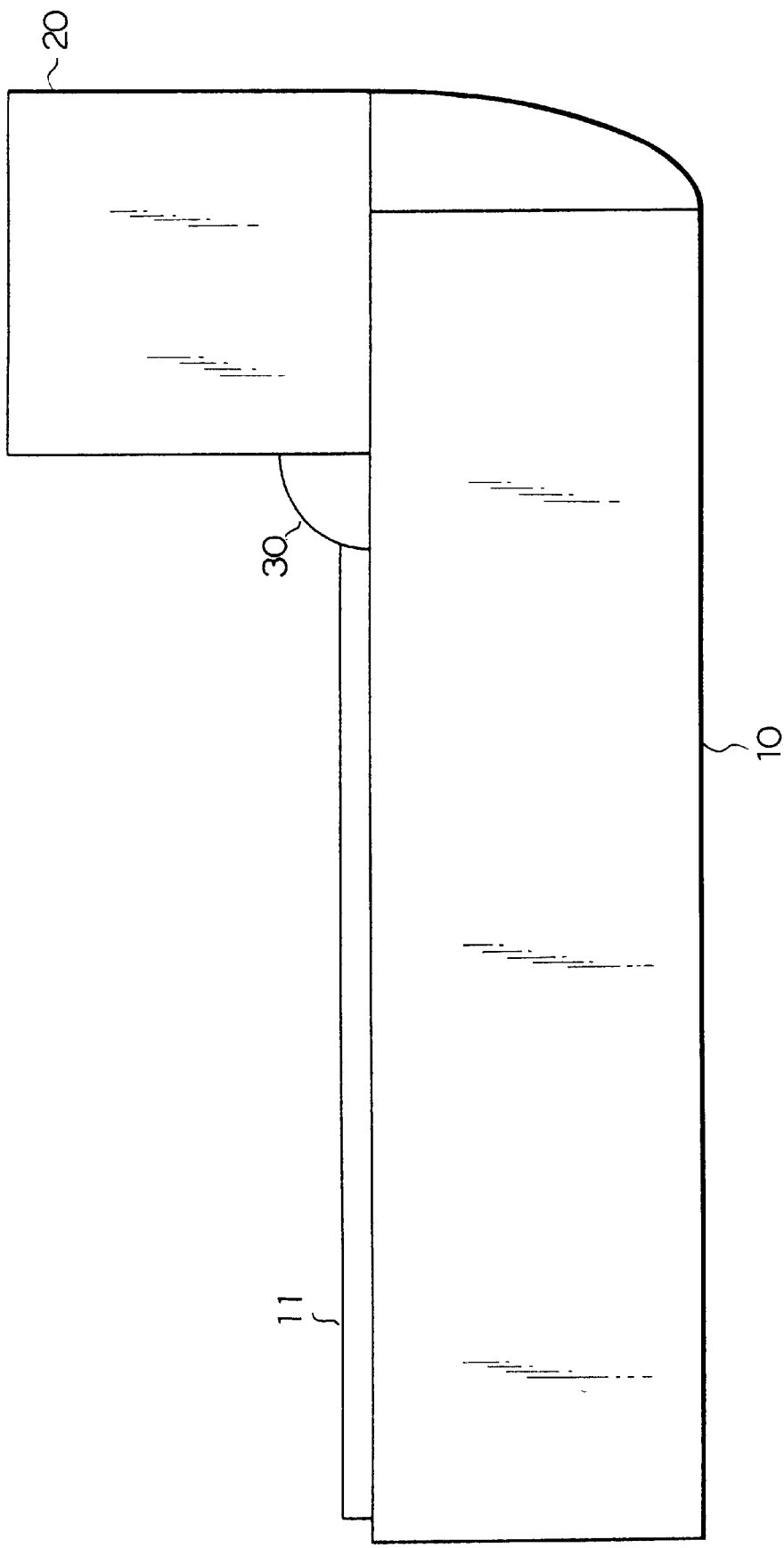

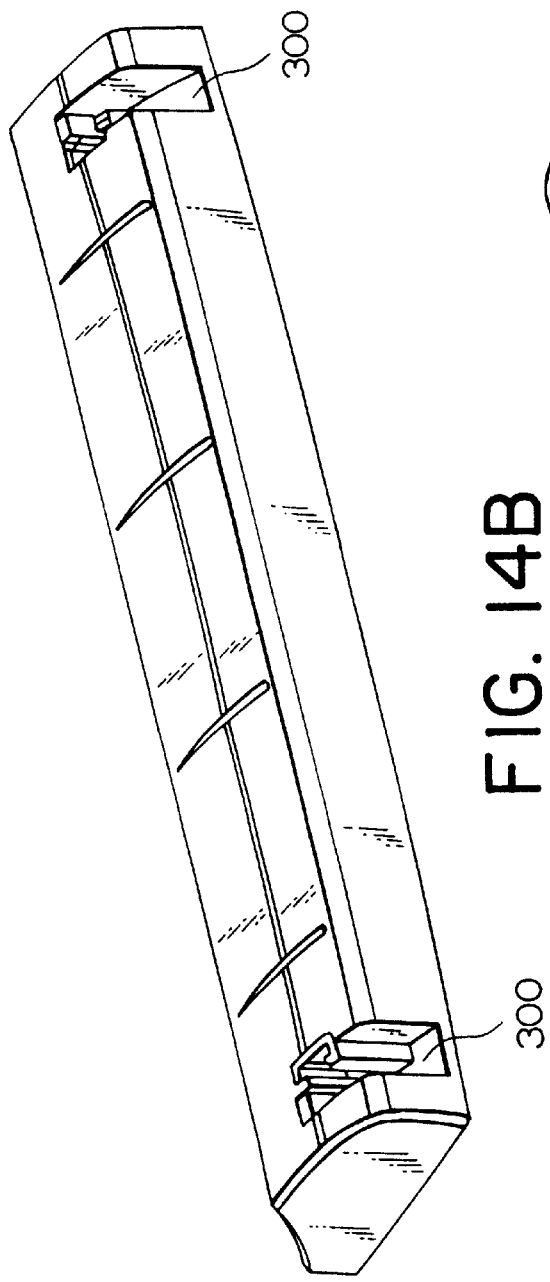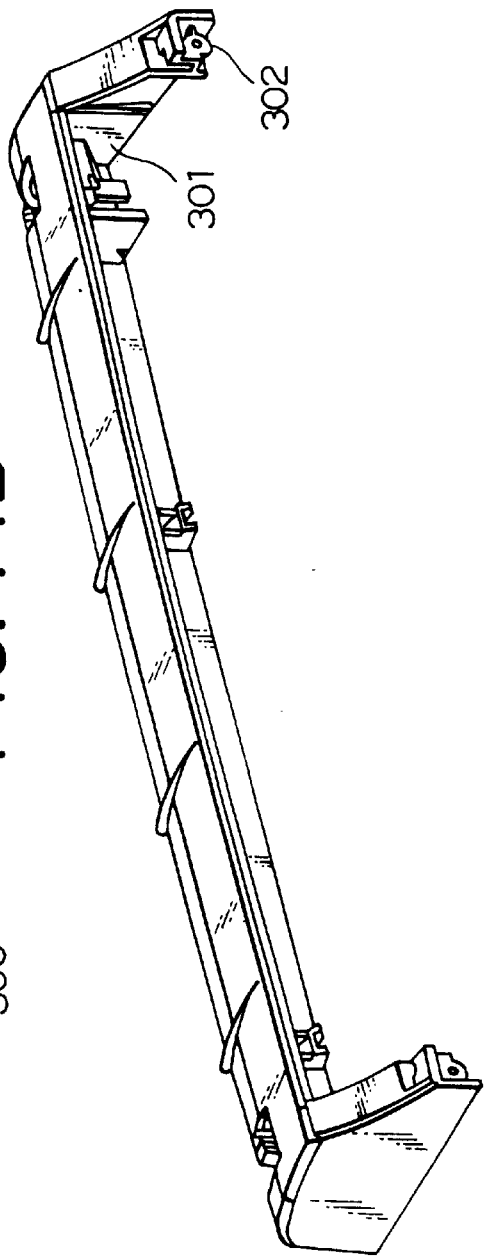
FIG. 14A
FIG. 14B

IMAGE SCANNER

BACKGROUND OF THE INVENTION

1. Field of the Invention

The present invention relates to an image scanner, and more particularly to a compact image scanner which includes a flat-bed-type document scanning mechanism and an automatic-paper-feed-type document scanning mechanism.

2. Description of the Related Art

Image scanners for reading images on documents can be divided into three types; i.e., a flat-bed-type document scanner in which an image is read from a document placed on a glass platen, through movement of a line image sensor; an automatic-paper-feed-type document scanner in which documents stacked in a hopper are pulled out and transferred a single sheet at a time, and an image is read from each sheet by use of a fixed line image sensor; and an image scanner which provides functions corresponding to those of the flat-bed-type document scanner and the automatic-paper-feed-type document scanner (herein after this image scanner may be referred to as a "dual-function image scanner").

Due to the necessity of providing two functions, such a dual-function image scanner involves a drawback of an increased size. Therefore, in order to enhance the utility of such an image scanner, a technique for realizing a compact image scanner must be developed.

A conventional dual-function image scanner has a structure as shown in FIG. 17.

That is, the conventional image scanner 1 provides two separate image-scanner functions; i.e., a function corresponding to that of a flat-bed-type document scanner for reading a document which is placed on a glass platen 2, and a function corresponding to that of an automatic-paper-feed-type document scanner for picking documents from a hopper 3 one sheet at a time and reading each sheet while transporting it to a stacker 4. In the image scanner 1, the hopper 3 is disposed above the glass platen 2, and the stacker 4 is disposed to project from the apparatus body.

The hopper 3 is removably attached to the apparatus body. When the image scanner 1 is used as a flat-bed-type document scanner, the hopper 3 is removed from the apparatus body. Alternatively, the hopper 3 may be hingedly attached to the apparatus body. In this case, when the image scanner 1 is used as a flat-bed-type document scanner, the hopper 3 is swung to a position at which the hopper 3 does not cause interference. In this state, a document placed on the glass platen 2 is read.

The conventional image scanner 1 having the above-described overall structure has an internal structure as shown in FIG. 18. That is, an optical unit 5 of the flat-bed-type document scanner is moved to a read position of an automatic-paper-feed-type document scanner in order to read the front face of a document. At the same time, the reverse face of the document is read by use of an optical unit 6, which is provided separately from the optical unit 5 and which is fixedly disposed at the read position of the automatic-paper-feed-type document scanner. In FIG. 18, reference numeral 11A denotes a document holding cover.

However, the image scanner 1 employing a conventional structure has a drawback of an increased size, because the stacker 4 is disposed to project from the apparatus body. In an exemplary case in which A4 documents are read along their longitudinal direction, since the length of A4 documents is about 300 mm, the stacker 4 projecting from the apparatus body must have a length of about 300 mm, resulting in an increase in apparatus size.

Further, the optical unit 5 provided in the flat-bed-type document scanner is used as an optical unit for the automatic-paper-feed-type document scanner. Therefore, the image scanner 1 has a relatively large length. That is, as shown in FIG. 19, when the flat-bed-type document scanner reads a document on the glass platen 2, the optical unit 5 of the flat-bed-type document scanner moves between the start point S and the end point E of a movement range MR. Further, when the optical unit 5 serves as an optical unit for the automatic-paper-feed-type document scanner, as indicated by a dotted line in FIG. 19, the optical unit 5 moves to a position F, at which the optical unit 5 reads the front face of a document while serving as the optical unit for the automatic-paper-feed-type document scanner. The position F is located below the position B, at which the optical unit 6 of the automatic paper-feed-type document scanner reads the reverse face of the document. Accordingly, the optical unit 5 must move to the read portion F of the automatic-paper-feed-type document scanner, thus increasing the length of the apparatus.

SUMMARY OF THE INVENTION

In view of the foregoing, an object of the present invention is to provide a compact improved image scanner which includes a flat-bed-type document scanning mechanism and an automatic-paper-feed-type document scanning mechanism.

According to one aspect of the present invention, there is provided an image scanner which comprises a flat-bed-type document scanning mechanism having a document holding cover; and an automatic-paper-feed-type document scanning mechanism disposed on the flat-bed-type document scanning mechanism and Discharging documents onto the document holding cover, wherein the document holding cover includes a groove and a stopper member fitted therein. The groove extends in the document transport direction and has a first engagement portion on its side wall. The stopper member has a base portion which has a second engagement portion that can be engaged with the first engagement portion and can be moved along the document transport direction while being guided by the groove, and a vertical portion projecting perpendicular from the base portion.

By virtue of the above-described structure, the stopper member can be inserted into and moved along the groove to thereby form a document receipt space on the document holding cover. Thus, the document holding cover can be used as a stacker.

In contrast to the case of the conventional scanner in which a stacker for receiving transported documents must be disposed such that the stacker projects from the apparatus body, in the image scanner of the present invention, a hopper for stacking document to be read is disposed to project from the apparatus body. The hopper can be disposed at a larger slant angle than can the stacker of the conventional scanner. Therefore, the size of the apparatus can be decreased greatly as compared with the case of the conventional scanner.

According to another aspect of the invention, there is provided an image scanner which comprises a flat-bed-type document scanning mechanism having a document holding cover; and an automatic-paper-feed-type document scanning mechanism disposed on the flat-bed-type document scanning mechanism and discharging documents onto the document holding cover, wherein an end of the document holding cover serves as a document-receipt-side end and has a concave shape concavely curved toward the document transport direction.

The image scanner according to the present aspect has the following additional advantage.

Since the document-receipt-side end of the document holding cover has a concave concavely curved toward the document transport direction, the document holding cover can reliably receive documents transported from the automatic-paper-feed-type document scanning mechanism. Therefore, the document holding cover can be used as a location to which documents are transported.

According to still another aspect of the present invention, there is provided an image scanner which comprises a flat-bed-type document scanning mechanism having a document holding cover; an automatic-paper-feed-type document scanning mechanism; arm members provided at an end portion of the document holding cover and being projected outward and upward, each of the arm members having a through-hole at its distal end; rotary shaft members, each having a slider portion, and a cylindrical portion which projects from the slider portion and is rotatably inserted into the through-hole of the corresponding arm member; and a cover member for covering the joint portion between the two document scanning mechanisms, the cover member having first cut-out spaces which extend vertically and accommodate the arm members, and second cut-out spaces which extend vertically and accommodate the rotary shaft members.

The cylindrical portions of the rotary shaft members are inserted into the through-holes of the arm members, and the rotary shaft members are then inserted into the cut-out spaces of the connection cover for covering the joint potion between the flat-bed-type document scanning mechanism and the automatic-paper-feed-type document scanning mechanism. Thus, opening/closing operation of the document holding cover is enabled.

The image scanner according to the present aspect has the following advantage in addition to the advantage of size reduction.

This structure enables the document holding cover to be used as a location to which documents are transferred, and further enables the flat-bed-type document scanning mechanism to read a thick document such as a book.

According to still another aspect of the present invention, there is provided an image scanner which comprises a flat-bed-type document scanning mechanism having a document holding cover and an optical unit; and an automatic-paper-feed-type document scanning mechanism disposed on the flat-bed-type document scanning mechanism and discharging documents onto the document holding cover, wherein the automatic-paper-feed-type document scanning mechanism has a first optical unit for reading a front face of a document and a second optical unit for reading a reverse face of the document, provided independently of an optical unit of the flat-bed-type document scanning mechanism.

The image scanner according to the present aspect has the following advantage in addition to the advantage of size reduction.

The above structure eliminates the necessity of moving the optical unit of the flat-bed-type document scanning mechanism to the read position of the automatic-paper-feed-type document scanning mechanism. Therefore, the length of the image scanner can be reduced as compared with the conventional scanner.

BRIEF DESCRIPTION OF THE DRAWINGS

FIGS. 4A–4C show an example of a stopper groove;

FIGS. 9A and 9B are explanatory views showing a movement area of the document stopping portion;

FIG. 12 is an explanatory view showing a state of attachment of the rotary shaft member;

FIG. 13 is an explanatory view showing a connection cover;

FIGS. 14A, 14B, 15A, and 15B show an example of the connection cover;

DESCRIPTION OF THE PREFERRED EMBODIMENT

An embodiment of the present invention will now be described.

Figure 1:
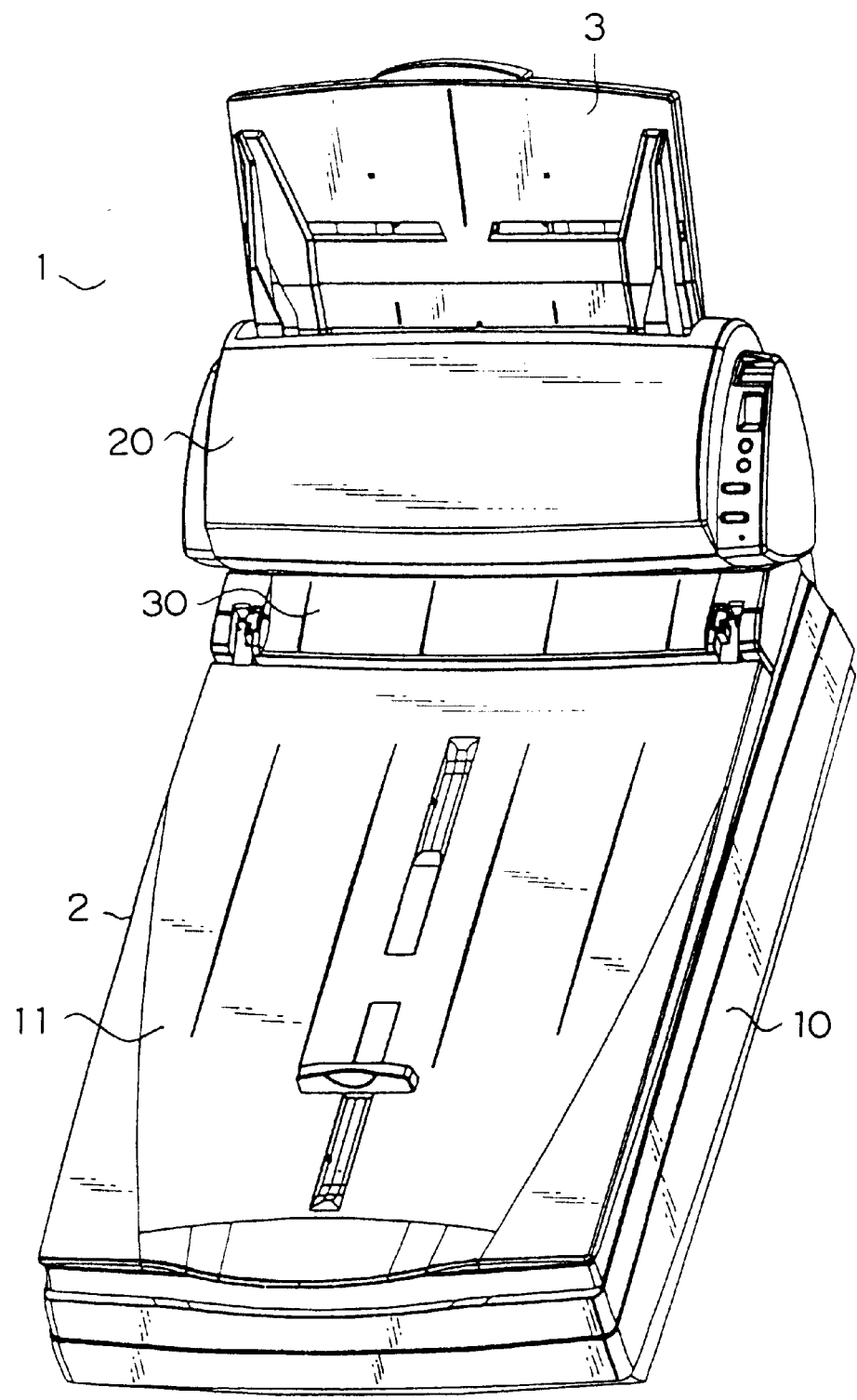
FIG. 1 shows an embodiment of the present invention.

FIG. 1 shows the embodiment of the present invention. As shown in FIG. 1, an image scanner 1 of the present invention employs a structure such that a flat-bed-type document scanning mechanism 10 and an automatic-paper-feed-type document scanning mechanism 20 are assembled together, and such that a hopper 3 for stacking documents to be read is disposed to project from an apparatus body; and in place of a stacker 4 which has been used in a conventional scanner, a document holding cover 11 provided on a platen 2 of the flat-bed-type document scanning mechanism 10 is used as a location to which documents are transported after being read. In FIG. 1, reference numeral 30 denotes a connection cover for covering the joint portion between the flat-bed-type document scanning mechanism 10 and the automatic-paper-feed-type document scanning mechanism 20.

In the image scanner 1, the hopper 3 can be disposed at a larger slant angle as compared with the stacker 4 of the conventional scanner in which the stacker 4 is disposed to project from the apparatus body. Therefore, the overall length of the apparatus can be decreased greatly as compared with the conventional scanner.

Figure 2:
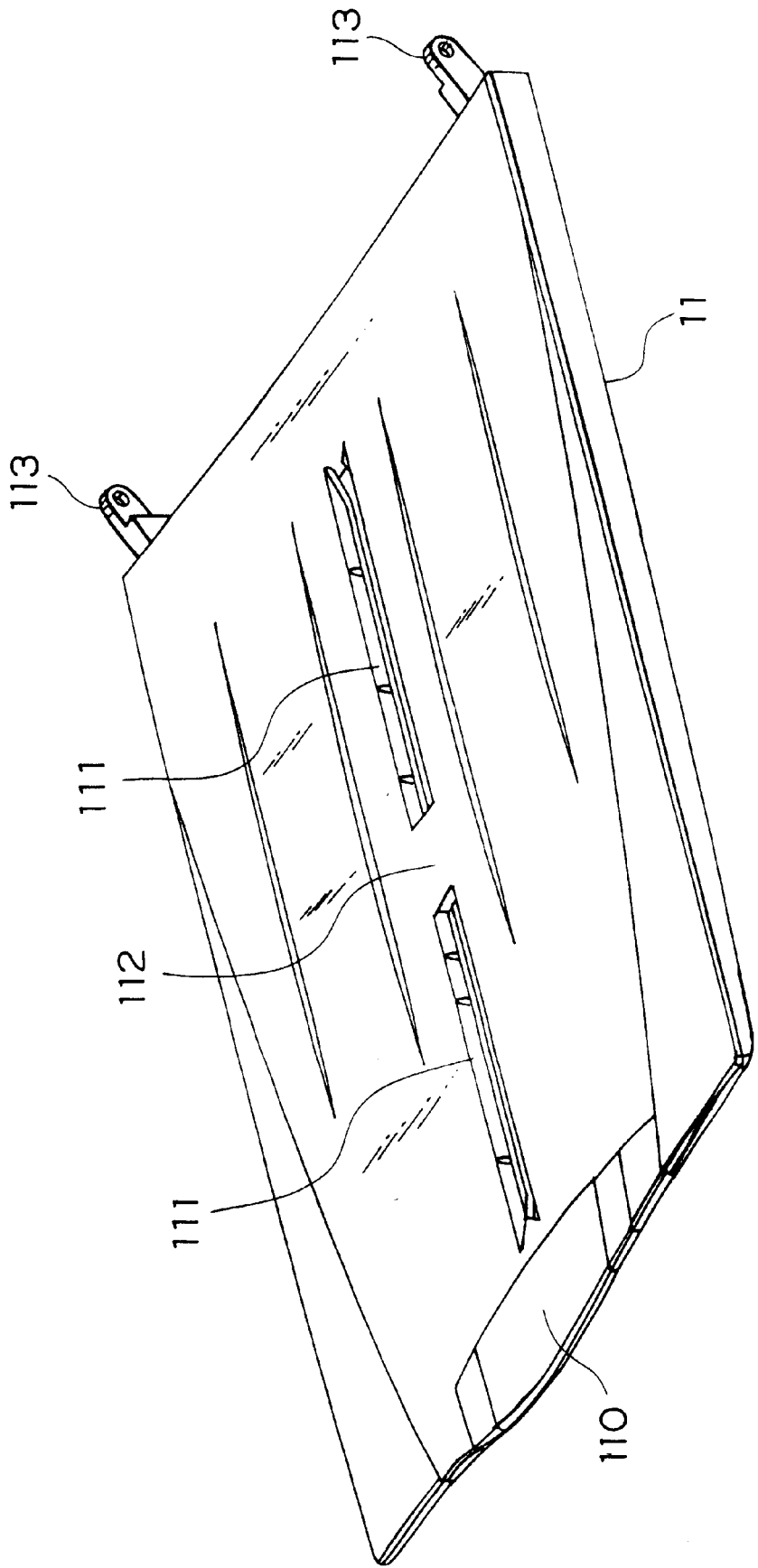
FIG. 2 and FIG. 3 show an example of a document holding cover.

FIG. 2 shows an example of the document holding cover 11 used in place of the stacker 4.

The document holding cover 11 has a size of about 400 mm (length)×about 300 mm (width). As shown in FIG. 2, in addition to a holding projection 110 which a user holds, the document holding cover 11 has a stopper groove 111 having a size of about 15 mm (width)×about 280 mm (length)× about 5 mm (depth); a bridge portion 112 provided on the surface of the cover to cross the stopper groove 111 at its longitudinal center; and two connection arms 113 which are provided at right and left ends of an end portion of the document holding cover 11 located on the side of the connection cover 30 and which project outward and upward.

Figure 3:
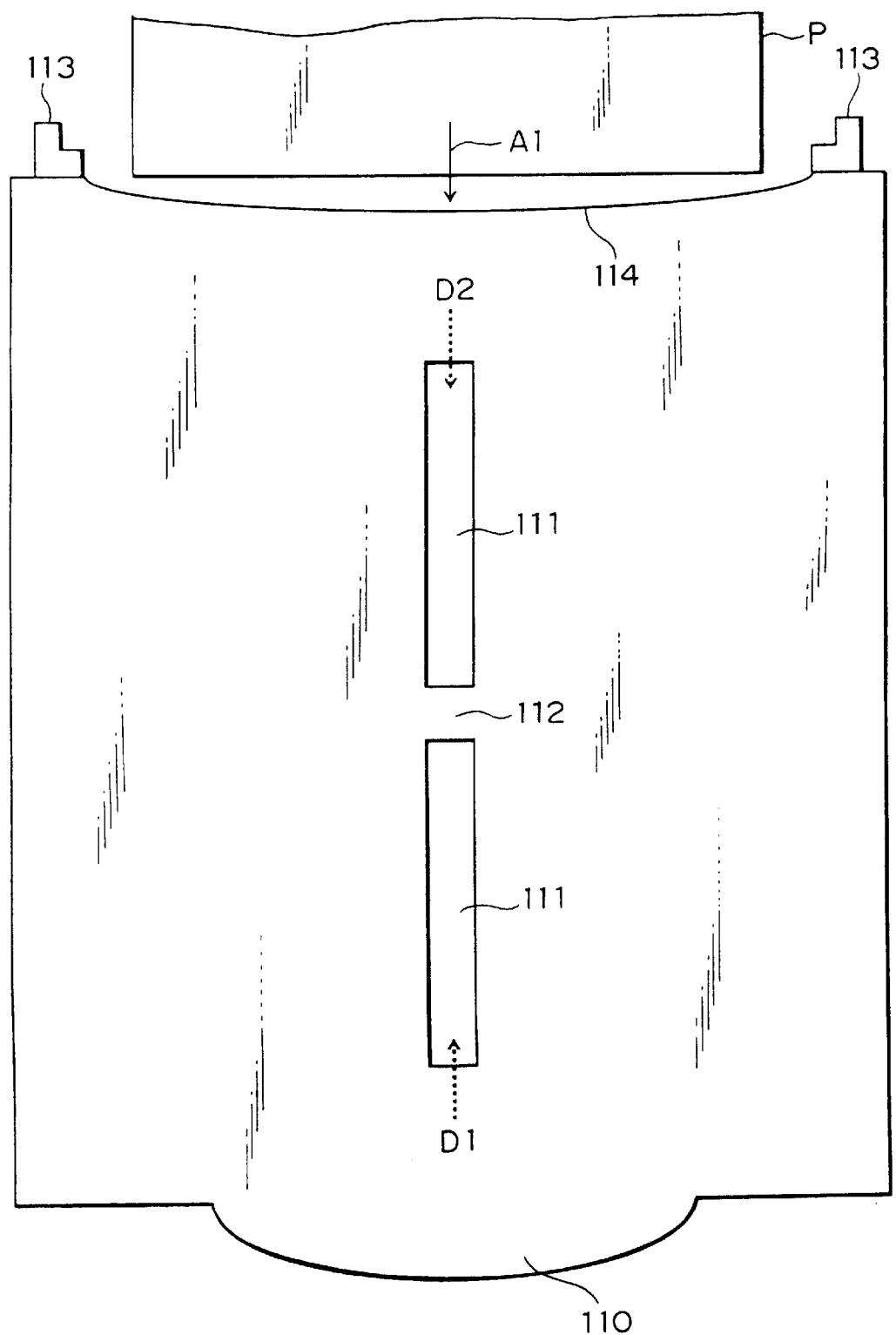

Although not shown clearly in FIG. 2, the end portion of the document holding cover 11 located on the side of the connection cover 30 has a concave shape 114, which, as shown in FIG. 3, is concavely curved toward the document transport direction. The concave shape prevents a document P which is transported from the automatic-paper-feed-type document scanning mechanism 20 in the direction of arrow A1 from falling in the gap between the document holding cover 11 and the connection cover 30.

That is, when the end portion of the document holding cover 11 located on the side of the connection cover 30 has a concave shape 114 curved toward the document transport direction, opposite transverse end portions of the document P which is transported from the automatic-paper-feed-type document scanning mechanism 20 are reliably received by the document holding cover 11, so that the transported document P does not fall in the gap between the document holding cover 11 and the connection cover 30.

FIGS. 4A to 4C show an example of the stopper groove 111 formed on the document holding cover 11. Among these drawings, FIG. 4A shows a cross section of the stopper groove 111 at a predetermined depth; FIG. 4B shows a cross section taken along line 4B—4B in FIG. 4A; and FIG. 4C shows a cross section taken along line 4C—4C in FIG. 4A.

Figure 5:
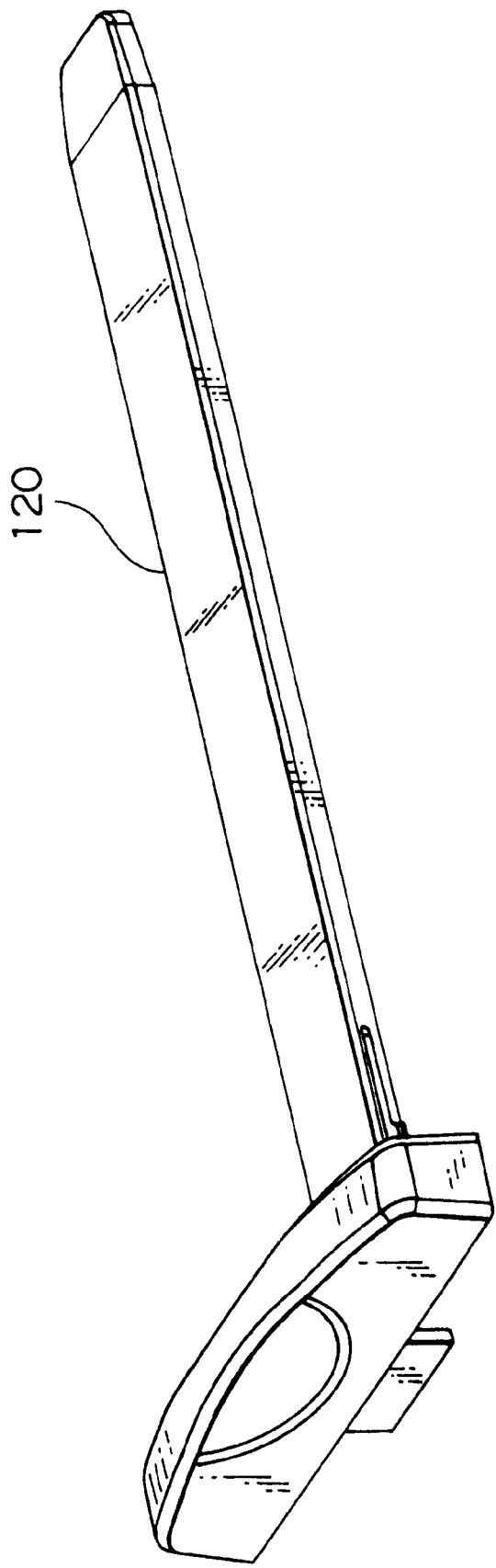
FIGS. 5 and 6A–6C show an example of a document stopper.

As shown in FIGS. 4A to 4C, the stopper groove 111 formed in the document holding cover 11 has, on either side wall, eight engagement depressions (or first engagement portions) 1110 at positions corresponding to different document sizes. At either longitudinal end of the stopper groove 111, a guide taper 1111 is formed to be smoothly continuous with the top face of the document holding cover 11. Further, two guide rails 1112 are formed on the bottom of the stopper groove 111. A document stopper 120 having a shape as shown in FIG. 5 is fitted into the stopper groove 111 having the above-described structure.

Figure 6A:
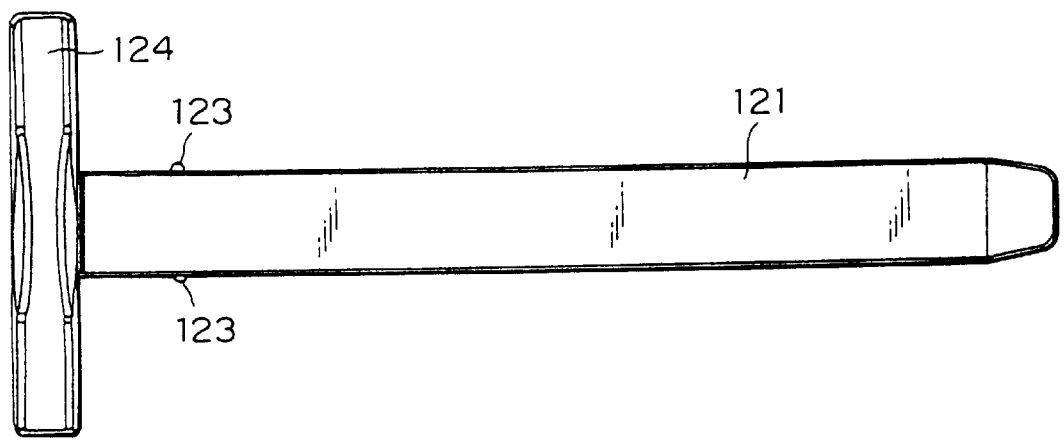
Figure 6B:
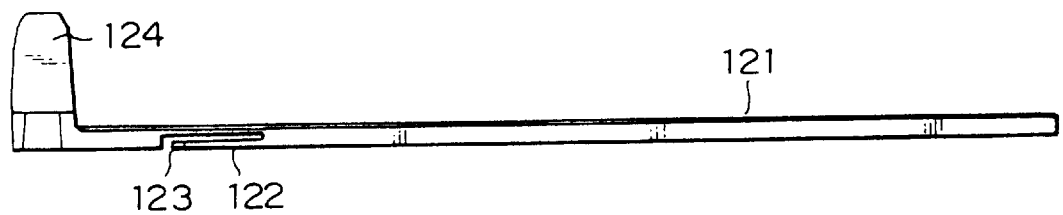
Figure 6C:
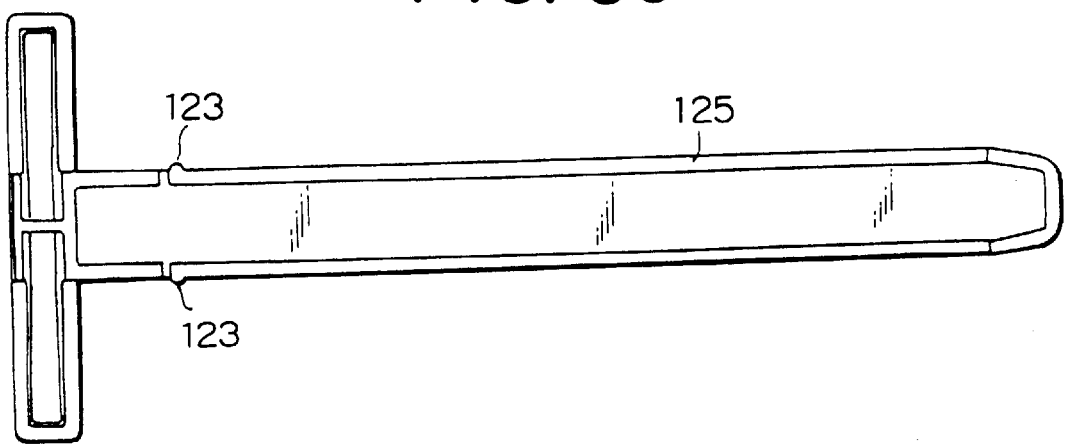

FIGS. 6A to 6C show the detailed structure of the document stopper 120. Among these drawings, FIG. 6A is a plan view of the document stopper 120; FIG. 6B is a side view of the document stopper 120; and FIG. 6C is a bottom view of the document stopper 120.

As shown in FIGS. 6A to 6C, the document stopper 120 has a base portion 121 to be fitted into the stopper groove 111; two flexible engagement levers 122 formed through partial removal of the base portion 121; engagement claws (or second engagement portions) 123 which project from the tip ends of the engagement levers 122 and are adapted to be engaged with the engagement depression 1110 of the stopper groove 111; and a document stopping portion 124 which projects upward from the base portion 121.

Figure 7:
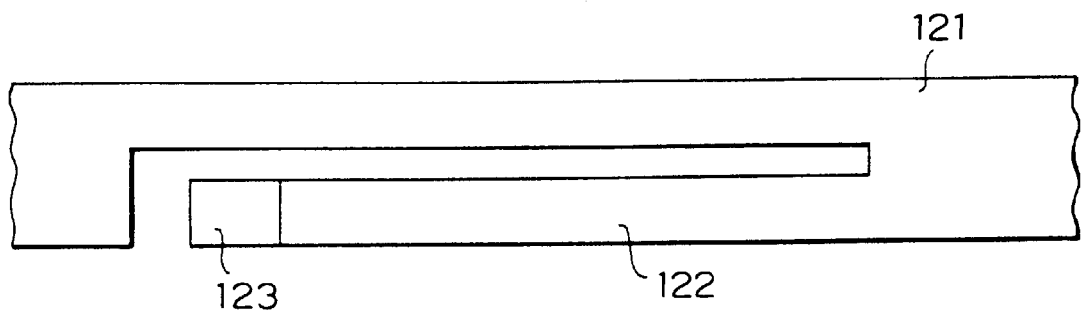
FIG. 7 shows an example of an engagement lever.

As shown in FIG. 6C, each of the engagement levers 122 is formed at a rim portion 125 which is formed on the bottom face of the base portion 121 along the circumferential edge thereof. As shown in FIG. 7, an L-shaped cut-out is formed in the base portion 121 of the rim portion 125 to form the engagement lever 122. The space between the engagement lever 122 and the base portion 121 is rendered as small as possible in order to prevent application of a large force on the engagement lever 122 when the base portion 121 is fitted into the stopper groove 111.

Figure 8A:
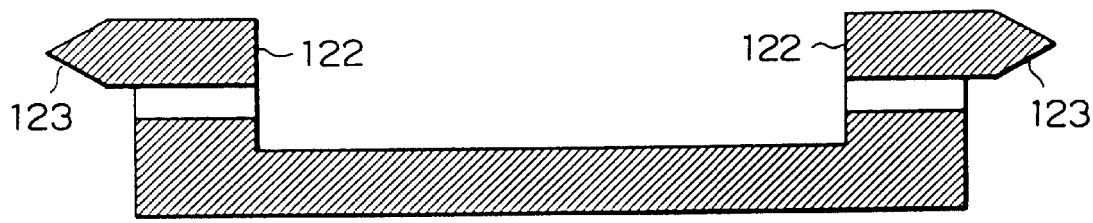
FIGS. 8A and 8B show an example of an engagement claw.

As shown in FIG. 8A, the engagement claws 123 formed at the tip ends of the engagement levers 122 are tapered toward their tip ends. This enables smooth insertion of the base portion 121 into the stopper groove 111.

Figure 8B:
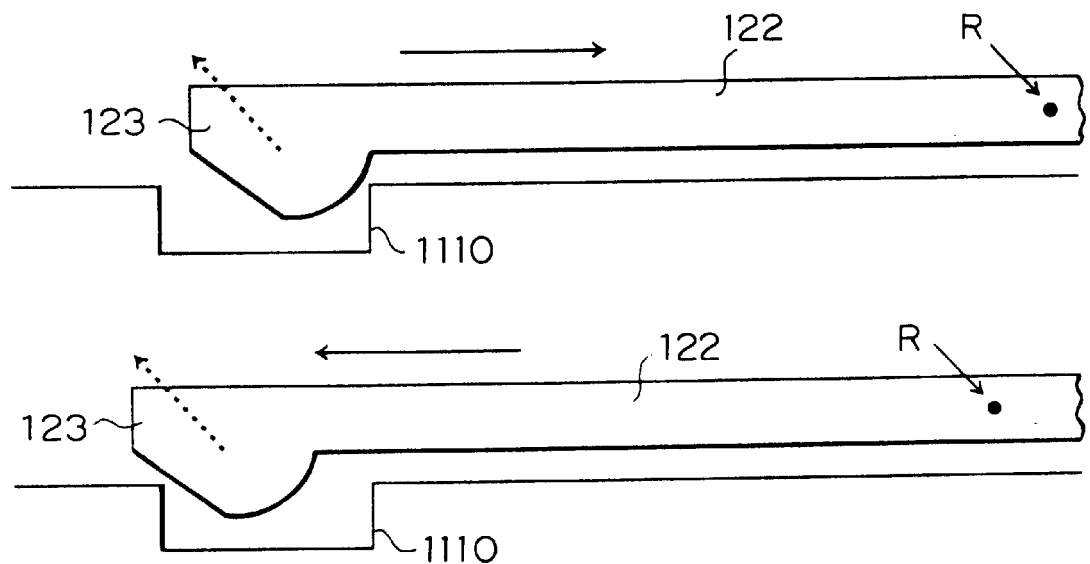

Further, as shown in FIG. 8B, the engagement claws 123 formed at the tip ends of the engagement levers 122 each have a rounded engagement surface on the side facing the pivoting center R of the engagement lever 122, and an inclined straight engagement surface on the side opposite the pivoting center R. The rounded engagement surface enables the base portion 121 to move smoothly along the stopper groove 111. The inclined engagement surface enables the engagement claw 123 to smoothly disengage from the engagement depression 1110, as indicated by broken lines in FIGS. 8B and 8C, upon movement of the base portion 121.

The document stopper 120 having the above-described structure is inserted into the stopper groove 111 and is stopped at a designated position at which the engagement claws 123 engage the engagement depressions 1110. Thus, upon engagement, the document stopper 120 is ready for stopping documents transported from the automatic-paper-feed-type document scanning mechanism 20 by the document stopping portion 124.

During the insertion operation, the guide taper 1111 of the stopper groove 111 enables smooth insertion of the document stopper 120 into the stopper groove 111. Further, the guide rails 1112 of the stopper groove 111 enable smooth travel of the document stopper 120 within the stopper groove 111.

Once the document stopper 120 is stopped at a designated position through engagement of the engagement claws 123 with the engagement depressions 1110, the document stopper 120 remains in the stopper groove 111 even when the document holding cover 11 is opened, because the document stopper 120 is held by the engagement and by the bridge portion 112.

As shown in FIG. 3, the document stopper 120 can be inserted into the stopper groove 111 from either of the opposite longitudinal ends thereof; i.e., in an insertion direction D1 or in an insertion direction D2. Therefore, as shown in FIGS. 9A and 9B, the document stopping portion 124 can be moved on the document holding cover 11 over a wide range in order to cope with various sizes of documents to be read by the automatic-paper-feed-type document scanning mechanism 20. Arrow A1 indicates the document transport direction.

Next, a mechanism for enabling opening and closing of the document holding cover 11 will be described.

As shown in FIG. 2, the document holding cover 11 has the two connection arms 113, which are provided at right and left ends of the end portion of the document holding cover 11 located on the side of the connection cover 30 and which project outward and upward.

Figure 10A:
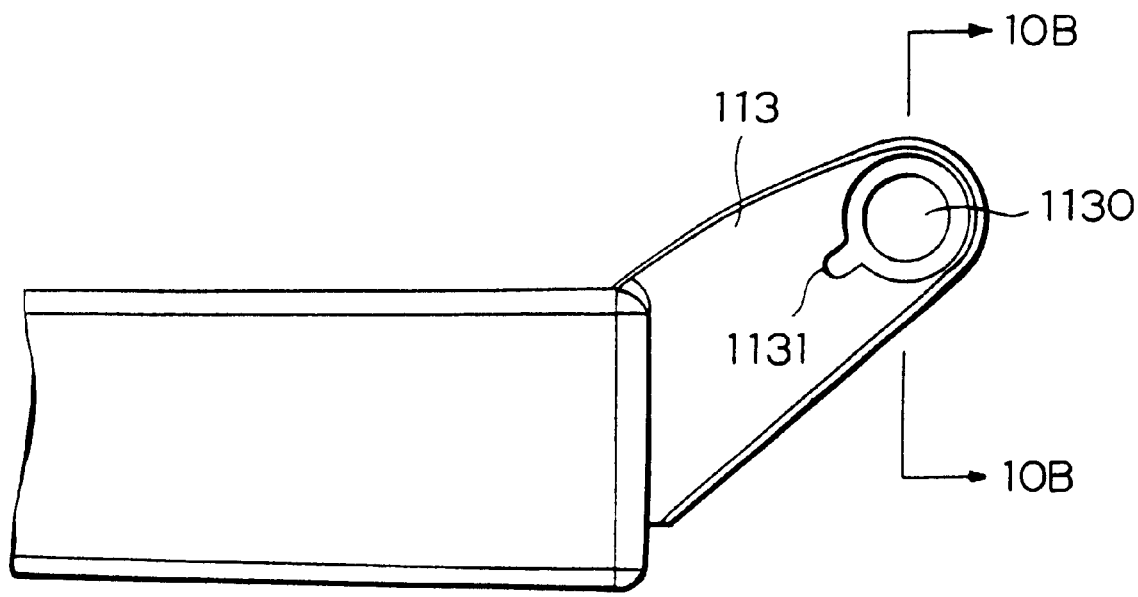
FIGS. 10A and 10B show an example of connection arms.
Figure 10B:
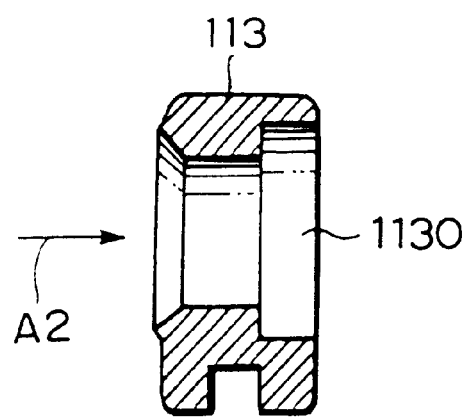

FIGS. 10A and 10B show an example of the connection arms 113. Among these drawings, FIG. 10A is a side view of a connection arm 113; and FIG. 10B shows a cross section taken along line 10B—10B in FIG. 10A.

As shown in FIGS. 10A and 10B, the connection arm 113 has a through-hole 1130 at its distal end. As shown in FIG. 10B, the through-hole 1130 has an insertion taper portion on an entrance side (side from which a rotary shaft member 130, which will be described later, is inserted into the through-hole 1130). The through-hole 1130 has a diameter equal to the minimum diameter of the taper portion at an axially intermediate portion and has a larger diameter on the exit side. Further, as shown in FIG. 10A, a cut-out 1131 is formed on the exit side to be continuous with the larger diameter portion of the through-hole 1130. In FIG. 10B, arrow A2 indicates the direction of insertion of the rotary shaft member 130.

Figure 11C:
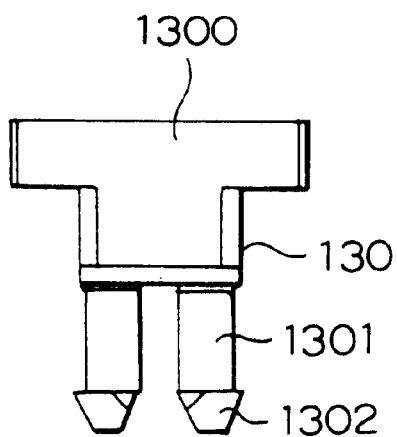
FIGS. 11A–11C show an example of a rotary shaft member.
Figure 11A:
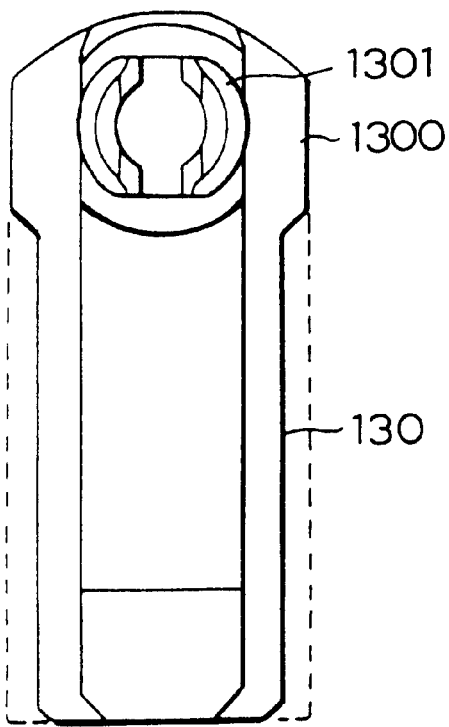
Figure 11B:
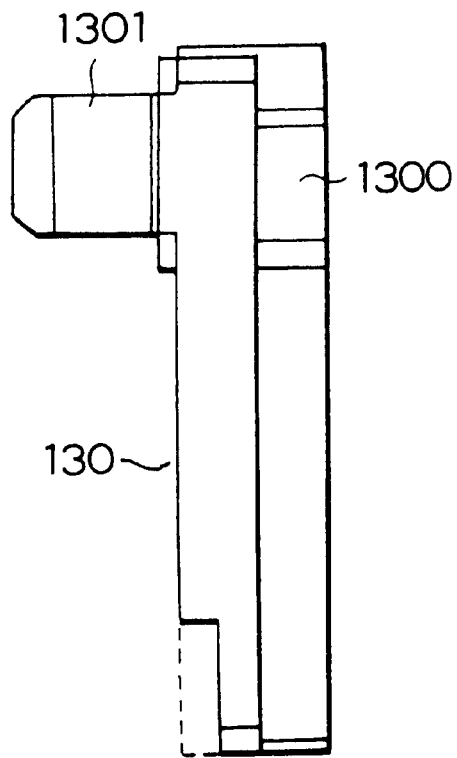

FIGS. 11A to 11C show an example of the rotary shaft member 130, which is inserted into the through-hole 1130 of the connection arm 113. Among these drawings, FIG. 11A is a front view of the rotary shaft member 130, FIG. 11B is a side view of the rotary shaft member 130, and FIG. 11C is a top view of the rotary shaft member 130.

As shown in FIGS. 11A to 11C, the rotary shaft member 130—which is inserted into the through-hole 1130 of the connection arm 113—has a slider portion 1300 serving as a base body and having a T-shaped cross section, and a cylindrical portion 1301 projecting from the slider portion 1300 and being divided into two portions.

As indicated by broken lines in FIG. 11A, left and right faces of the slider portion 1300 as viewed from the front side are removed in order to form a stepped shape having a narrowed distal end. Further, as indicated by a broken line in FIG. 11B, a front face of the slider portion 1300 as viewed from the front side is removed in order to form a stepped shape having a narrowed distal end and a stepped portion at a position different from the position of stepped portions formed on the left and right portions. A tapered removal-preventing portion 1302 having a larger diameter is formed at the distal end of the cylindrical portion 1301. The slider portion 1300 may be formed in a tapered shape such that the cross-sectional area decreases toward its distal end, rather than in a stepped shape.

Since the cylindrical portion 1301 of the rotary shaft member 130 having the above-described structure is divided into two pieces, the cylindrical portion 1301 is free to expand and contract. Therefore, when the cylindrical portion 1301 is inserted into the through-hole 1130 of the connection arm 113 and the removal-preventing portion 1302 reaches the exit portion of the through-hole 1130 having a larger diameter, the removal-preventing portion 1302 restores its original shape. Thus, the rotary shaft member 130 is rotatably attached to the connection arm 113.

The length of the cylindrical portion 1301 is determined such that the tip end of the cylindrical portion 1301 does not project from the through-hole 1130 of the connection arm 113 after insertion of the cylindrical portion 1301 into the through-hole 1130. When the rotary shaft member 130 is removed from the connection arm 113, a pin or a like object is inserted into the cut-out 1131 provided at the exit portion of the through-hole 1130 in order to contract the cylindrical portion 1301, to thereby enable removal of the rotary shaft member 130.

When the slider portions 1300 are oriented perpendicular to the document holding cover 11 after insertion of the rotary shaft members 130 into the connection arms 113, as shown in FIG. 12, the slider portions 1300 each have a T-shaped cross section as viewed from directly above the slider portions 1300.

The connection cover 30 shown in FIG. 2 is provided in order to cover the joint portion between the flat-bed-type document scanning mechanism 10 and the automatic-paper-feed-type document scanning mechanism 20 as shown in FIG. 13. As shown in FIGS. 14A and 14C, the connection cover 30 has the two cut-out spaces 300 which accommodate the connection arms 113 with the rotary shaft member 130 such that the connection arms 113 can move vertically. Thus, vertical, parallel movement of the document holding cover 11 is enabled in order to cope with cases in which the flat-bed-type document scanning mechanism 10 reads a thick document such as a book.

As have been described with reference to FIGS. 11A to the slider portion 1300 serving as a base body of the rotary shaft member 130 has a stepped shape having a narrowed distal end. This structure solves the drawback such that if the slider portion 1300 is closely fitted into the cut-out spaces 300, the slider portion 1300 becomes difficult to move horizontally, resulting in difficulty in coping with cases in which a thick document such as a book is to be read. Further, as have been described with reference to FIGS. 11A to 11C, the positions of the stepped portions on the left and right faces are rendered different from that of the stepped portion on the front face of the slider portion 1300 (or, put another way, the timing of engagement of the stepped portions on the left and right faces with the wall of the cut-out spaces 300 is rendered different from that of the stepped portion on the front face of the slider portion 1300). This facilitates insertion of the slider portion 1300 into the cut-out spaces 300 when a thick document such as a book is to be read.

As shown in FIG. 14, the connection cover 30 has guide ribs 301 and screw holes 302. By use of the guide ribs 301, the connection cover 30 is positioned relative to an unillustrated metal sheet structural component, which joins the automatic-paper-feed-type document scanning mechanism 20 to the flat-bed-type document scanning mechanism 10. Subsequently, the connection cover 30 is fixed to the structural component by use of screws screwed into the screw holes 302.

Figure 15A:
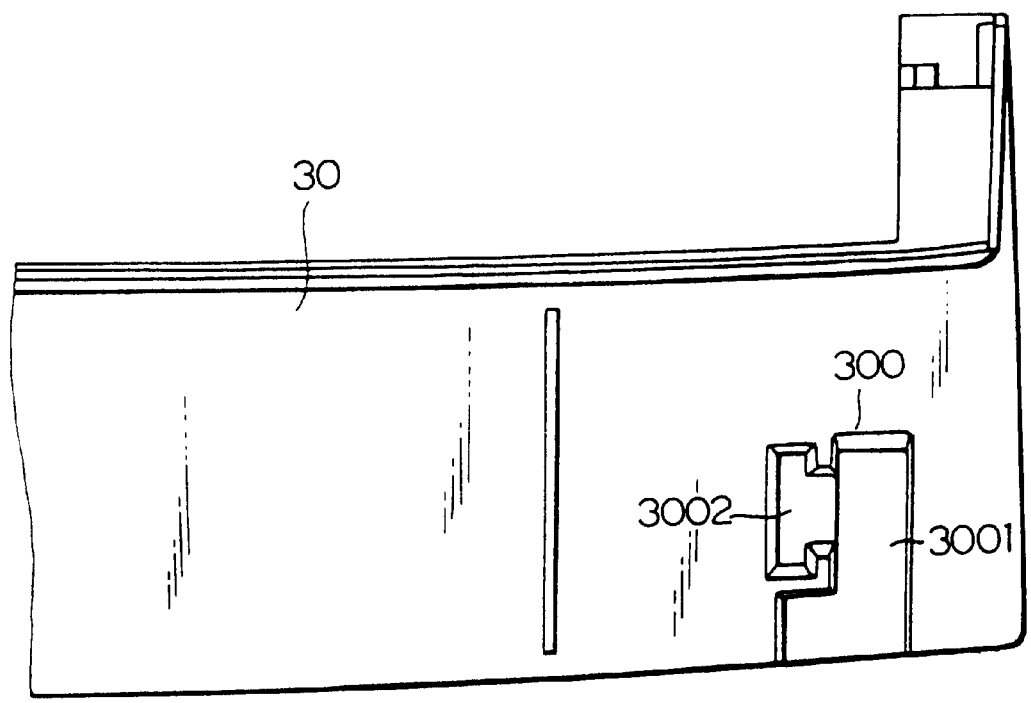
Figure 15B:
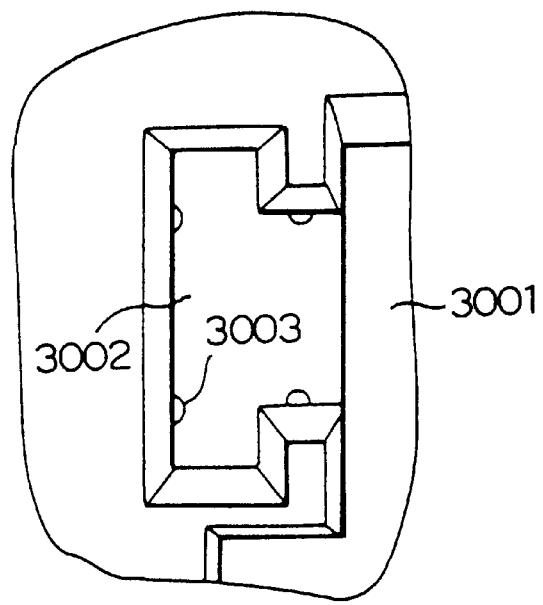

FIGS. 15A and 15B show the details of a cut-out space 300 formed in the connection cover 30. Among these drawings, FIG. 15A is a top view of the connection cover 30, and FIG. 15B is an enlarged view of a portion of the cut-out space 300.

As shown in FIG. 15A, the cut-out space 300 formed in the connection cover 30 has a first accommodation space 3001 for accommodating the connection arm 113, and a second accommodation space 3002 for accommodating the slider portion 1300 (serving as the base body of the rotary shaft member 130) having a T-shaped cross section. As shown in FIG. 15B, four guide ribs 3003 are formed on the wall of the second accommodation space 3002. The guide ribs 3003 eliminate the influence of warpage of the molded slider portion 1300, which warpage would otherwise raise a problem when the slider portion 1300 is inserted into the second accommodation space 3002.

The connection cover 30 has the cut-out spaces 300 having the above-described structure. Therefore, the connection arm 113—into which the rotary shaft member 130 has been inserted with the orientation as shown in FIG. 12—are inserted into the cut-out spaces 300.

The cylindrical portions 1301 of the rotary shaft members 130 are inserted into the through-holes 1130 of the connection arms 113. Therefore, the connection arms 113 become pivotable to thereby enable opening and closing of the document holding cover 11.

The connection arms 113 and the rotary shaft members 130 inserted into the cut-out spaces 300 can be moved vertically. Therefore, when a user uses the flat-bed-type document scanning mechanism 10 to scan a thick document such as a book, the user can move the document holding cover 11 vertically according to the thickness of the document. Thus, the scanning operation can be performed without application of excessive force to the document holding cover 11.

In the above-described structure, the slider portion 1300 serving as the base body of the rotary shaft member 130 has a T-shaped cross section, and the second accommodation space 3002 of each cut-out space 300 has a T-shaped cross section corresponding to the T-shaped cross section of the rotary shaft member 130. This structure prevents rotation of the document holding cover 11. Specifically, as is understood from FIG. 12, since a rotation prevention structure having a T-shaped cross section is provided at each of the left and right ends of the document holding cover 11, rotation (about a vertical axis) of the document holding cover 11 is prevented.

Next, there will be described the structure of the automatic-paper-feed-type document scanning mechanism 20 of the image scanner 1 according to the present invention.

Figure 16:
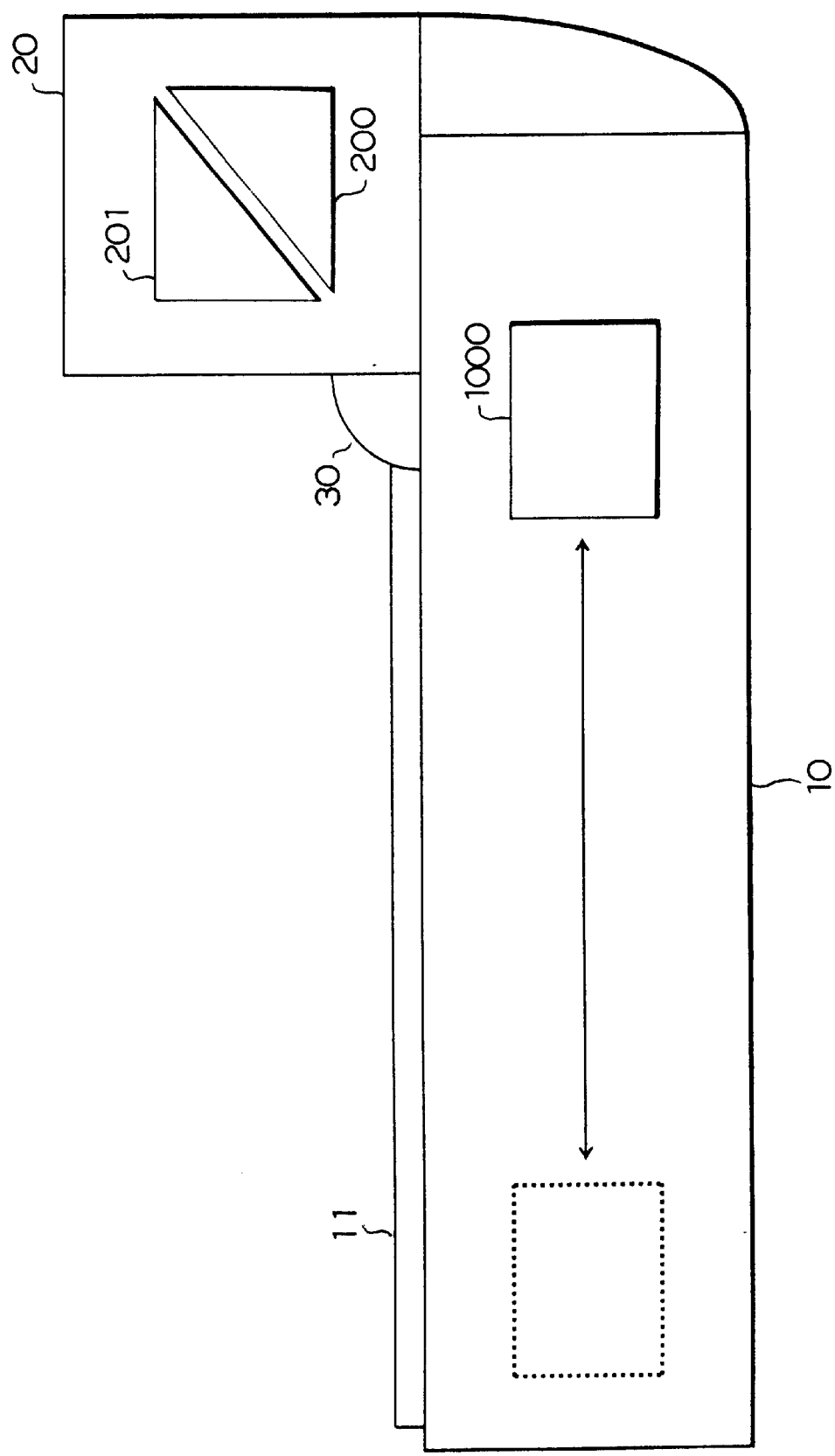
FIG. 16 shows an example of an automatic-paper-feed-type document scanning mechanism.
Figure 17:
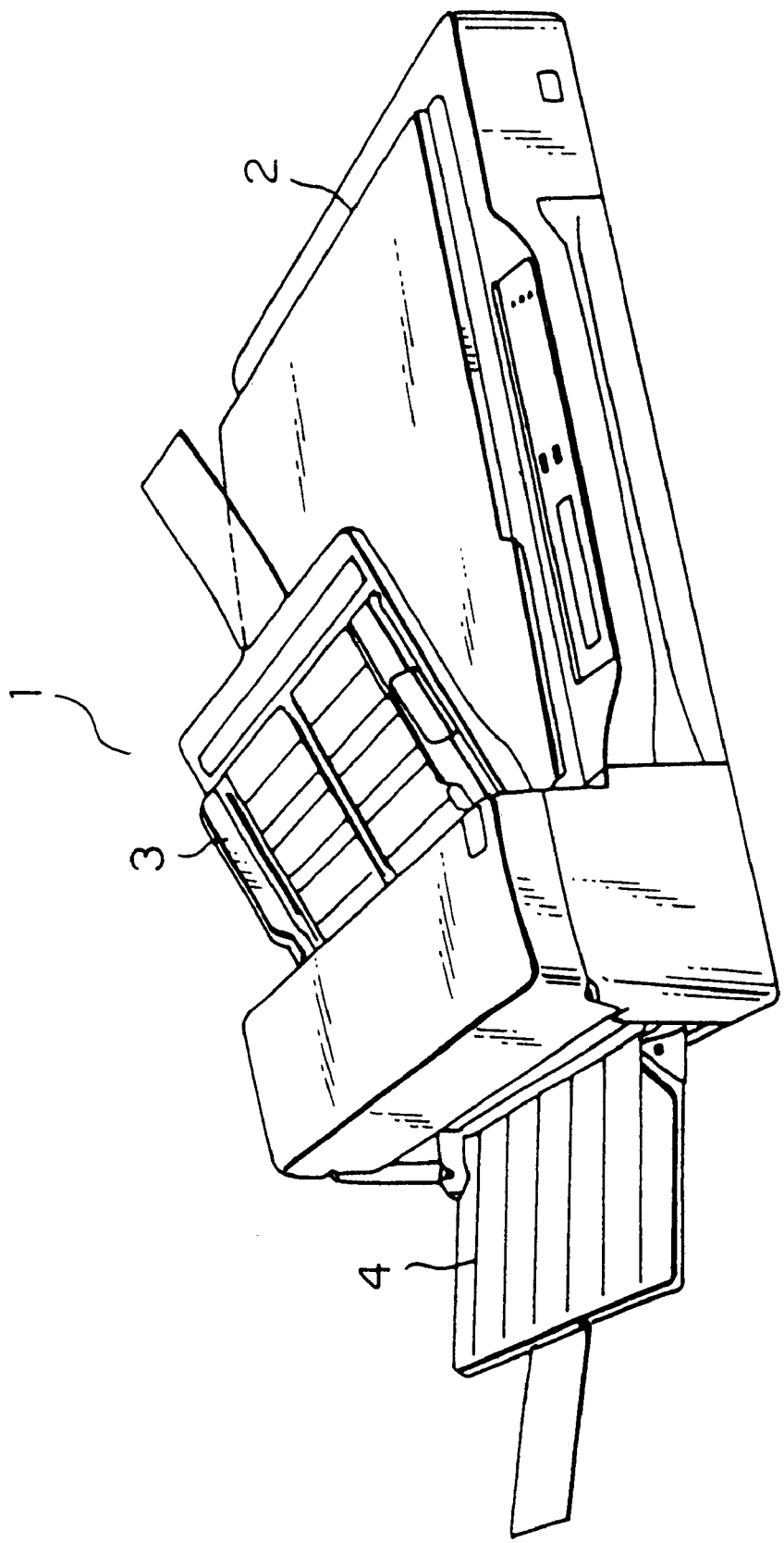
FIGS. 17, 18, and 19 are explanatory views showing a conventional image scanner.

FIG. 16 shows an example structure of the automatic-paper-feed-type document scanning mechanism 20 of the image scanner 1 according to the present invention.

As shown in FIG. 16, the automatic-paper-feed-type document scanning mechanism 20 of the image scanner 1 according to the present invention is characterized in that the automatic-paper-feed-type document scanning mechanism 20 has an optical unit 200 for reading the front face of a document and an optical unit 201 for reading the reverse face of the document, provided independently of an optical unit 1000 of the flat-bed-type document scanning mechanism 10.

Figure 18:
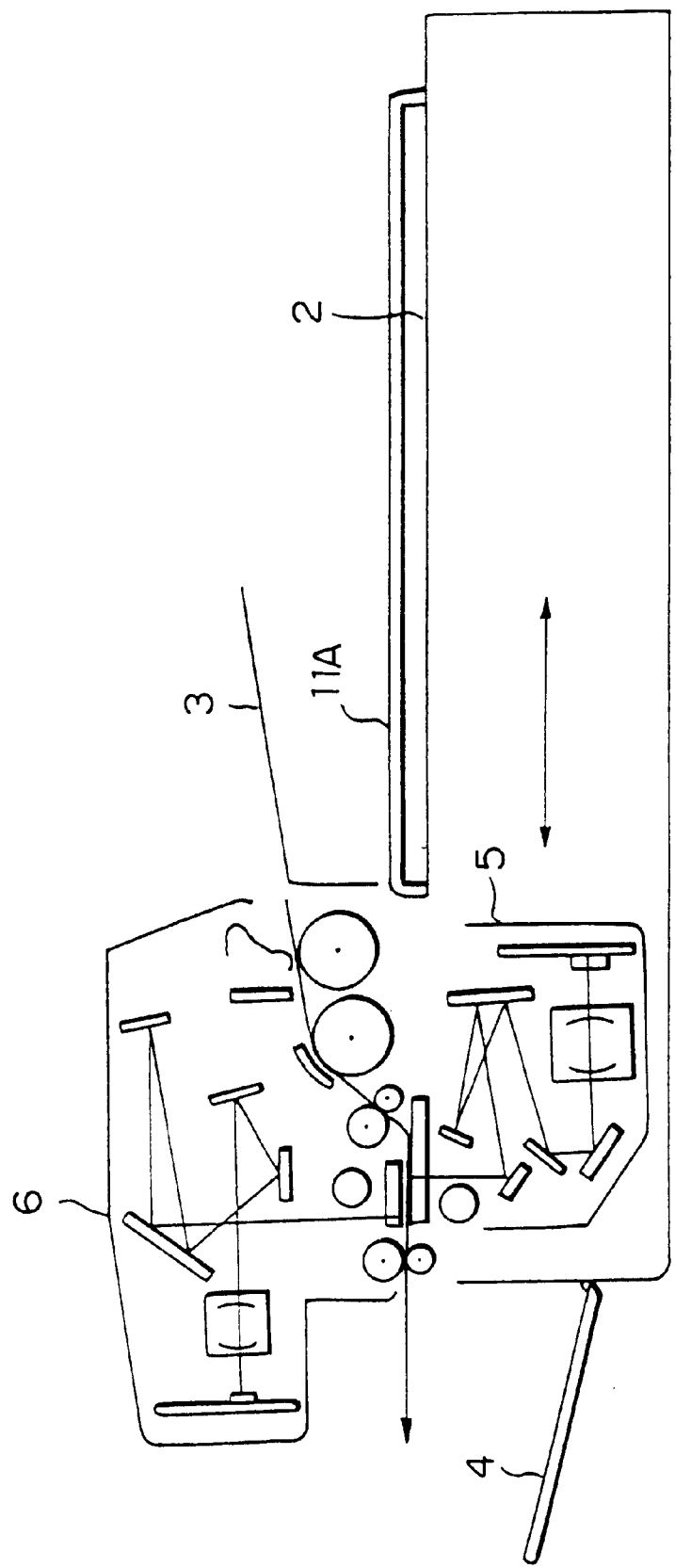
Figure 19:
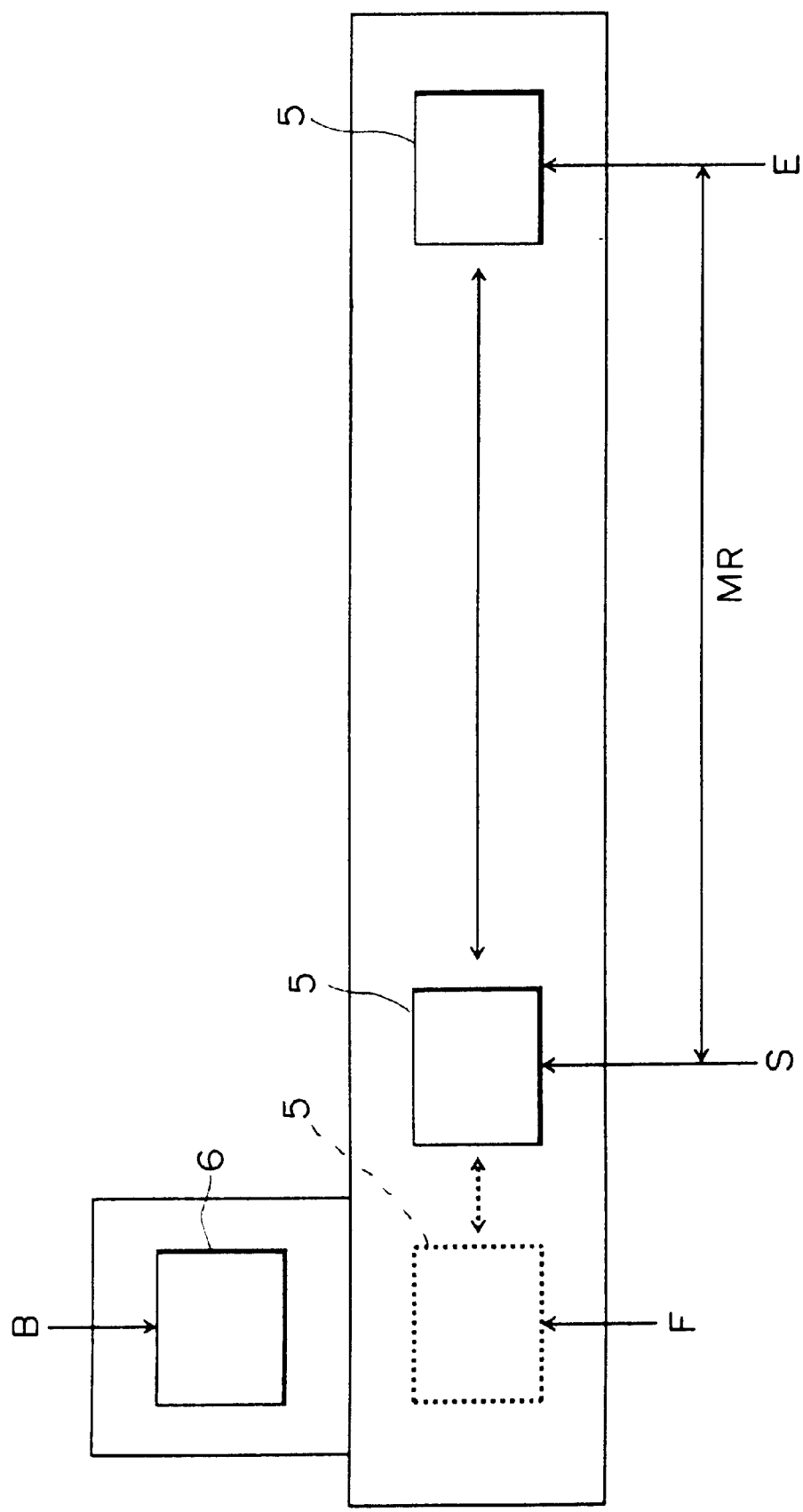

As described previously, the dual-function image scanner shown in FIG. 18 is constructed such that the optical unit 5 of the flat-bed-type scanner is used for the automatic-paper-feed-type scanner as well. That is, the optical unit 5 of the flat-bed-type document scanner is moved to a read position of the automatic-paper-feed-type document scanner in order to read the front face of a document, and at the same time, the reverse face of the document is read by use of an optical unit 6, which is provided separately form the optical unit 5 and is fixedly disposed at the read position of the automatic-paper-feed-type document scanner.

By contrast, in the image scanner 1 of the present invention, for the automatic-paper-feed-type document scanning mechanism 20, the optical unit 200 for reading the front face of a document and the optical unit 201 for reading the reverse face of the document are provided independently of an optical unit 1000 of the flat-bed-type document scanning mechanism 10.

This structure eliminates the necessity of moving the optical unit 1000 of the flat-bed-type document scanning mechanism 10 to the read position of the automatic-paper-feed-type document scanning mechanism 20, to thereby reduce the length of the image scanner 1 as compared with the case of the conventional scanner.

If there is employed a structure in which the optical unit 1000 of the flat-bed-type document scanning mechanism 10 is moved to the read position of the automatic-paper-feed-type document scanning mechanism 20, some space must be provided on the outer side of the read position. Since the structure of the present invention does not require such an extra space, the image scanner 1 can have shorter length as compared with the conventional scanner.

As described above, in the image scanner according to the present invention, even when a structure comprising a flat-bed-type document scanning mechanism and an automatic-paper-feed-type document scanning mechanism is employed, the size of the apparatus can be reduced considerably as compared with a conventional scanner. That is, in contrast to the case of the conventional scanner in which a stacker for receiving transported documents must be disposed such that the stacker projects from the apparatus body, in the image scanner of the present invention, a hopper for stacking document to be read is disposed to project from the apparatus body. The hopper can be disposed at a larger slant angle than can the stacker of the conventional scanner. Therefore, the size of the apparatus can be decreased greatly as compared with the case of the conventional scanner.

Such size reduction can be achieved through employment of an arrangement of the automatic-paper-feed-type document scanning mechanism such that the automatic-paper-feed-type document scanning mechanism discharges documents onto the document holding cover of the flat-bed-type document scanning mechanism. In connection with realization of such arrangement, the present invention provides a structure for stopping documents which comprises a groove formed in the document holding cover and a stopper member fitted therein. The groove extends in the document transport direction and has a first engagement portion on its side wall. The stopper member has a base portion which has a second engagement portion that can be engaged with the first engagement portion and can be moved along the document transport direction while being guided by the groove, and a vertical portion projecting perpendicular from the base portion.

This structure enables the stopper member to be inserted into and moved along the groove to thereby form a document receipt space on the document holding cover. Thus, the document holding cover can be used as a stacker.

In this case, a bridge portion may be formed on the document holding cover such that the bridge portion crosses the groove. The bridge portion prevents the stopper from coming off, which would otherwise occur when the document holding cover is opened.

Further, a taper for guiding insertion of the base portion may be formed on either longitudinal end of the groove. The taper enables smooth insertion of the stopper portion.

Moreover, the first engagement portion formed on the side wall of the groove may be formed to have a concave shape, and the second engagement portion formed on the base portion may be formed of a flexible element formed through partial removal of the base portion, and a claw element projecting from the flexible element. In this case, the claw element may have a tip-end shape which enables smooth movement of the base portion. Thus, the stopper member can be moved smoothly within the groove.

Further, in addition to the above-described arrangement for size reduction, the image scanner according to the present invention employs a structure such that a document-receipt-side end of the document holding cover has a concave shape which is concavely curved toward the document transport direction.

Since this structure enables the document holding cover to reliably receive documents transported from the automatic-paper-feed-type document scanning mechanism, the document holding cover can be used as a location to which documents are transported.

Moreover, in addition to the above-described arrangement for size reduction, the image scanner according to the present invention employs the following structure. That is, arm members are provided at the end portion of the document holding cover such that the arm members project outward and upward. Each of the arm members has a through-hole at its distal end. Rotary shaft members are provided. Each of the rotary shaft members has a slider portion, and a cylindrical portion which projects from the slider portion and is rotatably inserted into the through-hole of the corresponding arm member. Further, a cover member for covering the joint portion between the two document scanning mechanisms is provided. The cover member has first cut-out spaces which extend vertically and accommodate the arm members, and second cut-out spaces which extend vertically and accommodate the rotary shaft members.

The cylindrical portions of the rotary shaft members are inserted into the through-holes of the arm members, and the rotary shaft members are then inserted into the cut-out spaces of the connection cover for covering the joint potion between the flat-bed-type document scanning mechanism and the automatic-paper-feed-type document scanning mechanism. Thus, opening/closing operation of the document holding cover is enabled. This structure enables the document holding cover to be used as a location to which documents are transferred, and further enables the flat-bed-type document scanning mechanism to read a thick document such as a book.

In this case, the slider portion may be formed to have a T-shaped cross section. This structure prevents rotation of the document holding cover.

Further, the front/rear faces and/or left/right faces of the slider portion may be formed to have a stepped or taper shape having a narrowed distal end. Further, in the case in which the front/rear faces and left/right faces of the slider portion both have a stepped shape, the stepped portion of the front/rear faces may be formed at a position different from the position of the stepped portion of the left/right faces. This structure enables the rotary shaft members to be inserted into the cut-out spaces of the connection cover with some degree of looseness and further enables easy insertion of the rotary shaft members into the cut-out spaces. Therefore, the image scanner of the present invention can cope with cases in which the flat-bed-type document scanning mechanism scans a thick document such as a book.

Moreover, in addition to the above-described arrangement for size reduction, the image scanner according to the present invention employs a structure such that the automatic-paper-feed-type document scanning mechanism has an optical unit for reading the front face of a document and an optical unit for reading the reverse face of the document, provided independently of an optical unit of the flat-bed-type document scanning mechanism.

This structure eliminates the necessity of moving the optical unit of the flat-bed-type document scanning mechanism to the read position of the automatic-paper-feed-type document scanning mechanism. Therefore, the size of the image scanner can be reduced further.

What is claimed is:

1. An image scanner, comprising:
   a flat-bed-type document scanning mechanism having a document holding cover; and
   an automatic-paper-feed-type document scanning mechanism disposed on a flat-bed-type document scanning mechanism, the automatic-paper-feed-type document scanning mechanism discharging documents onto the document holding cover,
   wherein the document holding cove further includes:
      a groove extending in the document transport direction and having a first engagement portion on a side wall; and
      a stopper member having a base portion and a vertical portion, the base portion having a second engagement portion that can be engaged with the first engagement portion and can be moved along the document transport direction while being guided by the groove, and the vertical portion projecting perpendicular from the base portion and stopping the document transported from the automatic-paper-feed-type document scanning mechanism.

2. An image scanner according to claim 1, wherein a bridge portion is formed on the document holding cover, the bridge portion crossing the groove.

3. An image scanner according to claim 1, wherein a taper for guiding insertion of the base portion of the stopper member is formed on both longitudinal ends of the groove.

4. An image scanner according to claim 1, wherein the first engagement portion formed on the side wall of the groove has a concave shape; and the second engagement portion formed on the base portion includes a flexible element formed through partial removal of the base portion, and a claw element projecting from the flexible element.

5. An image scanner according to claim 4, wherein the claw element has a tip-end shape which enables smooth movement of the base portion.

6. An image scanner, comprising:
   a flat-bed-type document scanning mechanism having a document holding cover; and
   an automatic-paper-feed-type document scanning mechanism disposed on the flat-bed-type document scanning mechanism, the automatic-paper-feed-type document scanning mechanism discharging documents onto the document holding cover,
   wherein the document holding cover serves as a document receipt and has a concave shape concavely curved toward the document transport direction and provided at an upper end in the document transport direction of the document holding cover.

7. An image scanner, comprising:
   a flat-bed-type document scanning mechanism having a document holding cover;
   an automatic-paper-feed-type document scanning mechanism;
   arm members provided at an end portion of the document holding cover and being projected outward and upward, each of the arm members having a through-hole at its distal end;
   rotary shaft members, each having a slider portion, and a cylindrical portion which projects from the slider portion and is rotatably inserted into the through-hole of the corresponding arm member; and
   a cover member for covering the joint portion between the two document scanning mechanisms, the cover member having first cut-out spaces which extend vertically and accommodate the arm members, and second cut-out spaces which extend vertically and accommodate the rotary shaft members.

8. An image scanner according to claim 7, wherein the slider portion has a T-shaped cross section.

9. An image scanner according to claim 7, wherein at least a pair of the front and rear faces and left and right faces of the slider portion each have a stepped or taper shape having a narrowed distal end.

10. An image scanner according to claim 9, wherein both of the front and rear faces and left and right faces of the slider portion have a stepped shape; and a stepped portion of the front and rear faces is formed at a position different from the position of a stepped portion of the left and right faces.

11. An image scanner according to claim 7, wherein guide ribs are formed in the second cut-out spaces at positions to which the slider portion is inserted.

12. An image scanner according claim 7, wherein the through-hole of each of the arm members accommodates the cylindrical portion of the rotary shaft member while preventing coming off of the cylindrical portion, and a cut-out is formed at an end of the through-hole in order to break the engagement between the arm member and the cylindrical portion of the rotary shaft member.

* * * * *

UNITED STATES PATENT AND TRADEMARK OFFICE
CERTIFICATE OF CORRECTION

PATENT NO. : 6,661,543 B1
DATED : December 9, 2003
INVENTOR(S) : Yuukichi Morita It is certified that error appears in the above-identified patent and that said Letters Patent is hereby corrected as shown below:

<u>Title page,</u>
Item [56], References Cited, U.S. PATENT DOCUMENTS, please add
-- 5,568,573    10/1996    Wade et al. --.

<u>Column 6,</u>
Line 8, change "FIGS. 8B and 8C" to -- FIG. 8B --.

Signed and Sealed this

Thirtieth Day of March, 2004

JON W. DUDAS
*Acting Director of the United States Patent and Trademark Office*